Feb. 24, 1970     F. W. METZGER     3,497,245
TUBING JOINT
Filed Dec. 12, 1967
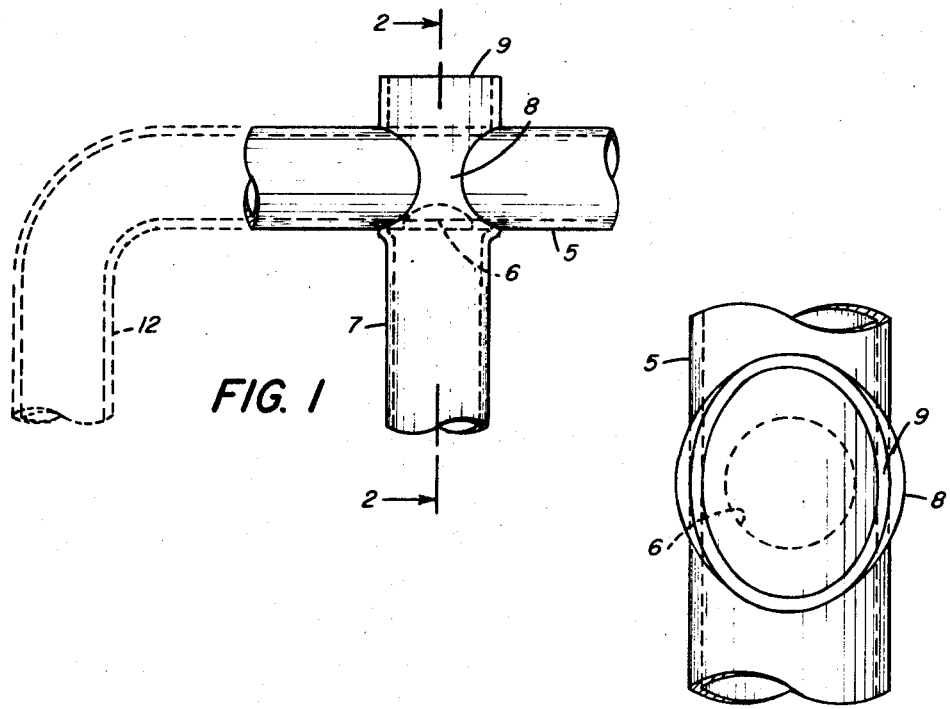
FIG. 1
FIG. 3
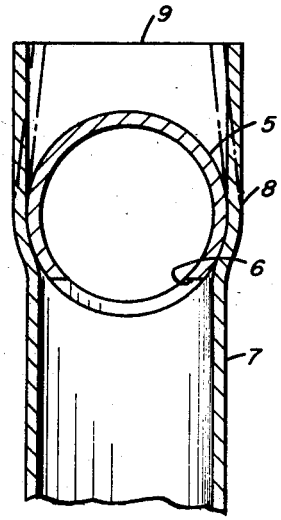
FIG. 2

United States Patent Office
3,497,245
Patented Feb. 24, 1970

3,497,245
TUBING JOINT
Frederick W. Metzger, Rochester, N.Y., assignor to
Rochester Form Machine, Inc., Rochester, N.Y., a
corporation of New York
Filed Dec. 12, 1967, Ser. No. 689,887
Int. Cl. F16l 41/00
U.S. Cl. 285—150                               2 Claims

ABSTRACT OF THE DISCLOSURE

A tubing joint, for joining a branch tube to a main tube, is formed by providing a branch tube having a portion of slightly larger diameter than that of the main tube. An opening is formed through this portion of the branch tube, of sufficient size so that the main tube can pass snugly through the opening in the branch tube, in a diametrical direction. The main portion of the branch tube extends in one direction from the diametrical opening, and an anchoring portion of the branch tube extends a slight distance in the opposite direction from the opening. The main tube is provided with a lateral opening in one side only, at the point where the branch is desired. The branch tube is slipped over the main tube (that is, with the main tube extending diametrically through the enlarged part of the branch tube) until the branch tube surrounds the lateral opening in the main tube. Then the extended or anchoring end of the branch tube is crimped in a direction crosswise of the main tube, which deforms the branch tube so that it becomes frictionally clamped on the main tube, sufficiently to hold it against accidental displacment during handling while the branch tube is soldered or brazed to the main tube. This eliminates the need for a special fixture or jig for holding the branch tube in position for soldering.

BACKGROUND OF THE INVENTION

There are many constructions in which it is desired to have one or more branch tubes extend laterally from a main tube, usually but not necessarily at a right angle to the main tube. A typical example of a construction where such a branch is desired, is in refrigerating apparatus, particularly air conditioning apparatus as used in automobiles. A common construction in such apparatus includes aluminum tubing, usually having a diameter of about ⅜ of inch, some of the sections of tubing having one or more branches extending laterally at an angle (usually a right angle) to the first tube, which may for convenience be called the main tube.

Various ways of connecting a branch tube to a main tube are known in the art. For example, a conventional T-fitting may be used. The main tube must be cut at the point where the T-fitting is to be inserted. One cut end of the main tube is inserted in one end of the T-fitting; another cut end of the main tube is inserted in the opposite end of the T-fitting; and a cut end of the branch tube is inserted in the third end or arm of the T-fitting, at right angles to the first two arms thereof. Then the joints between the T-fitting and the tube ends must be brazed or soldered to make them fluid tight, and this is a costly and time-consuming operation if the joints are individually brazed or soldered by hand; or if it is desired to solder the joints by a dip process, then it is necessary to use some sort of jig or fixture to hold the parts against accidental movement relative to each other while they are dipped in the soldering bath.

Another form of joint known in the prior art involves what is sometimes called a saddle fitting or saddle connection. Either as a structure formed integrally on the end of the branch tube or second tube, or as a separate fitting to which the second tube is to be attached, there is provided a flange having a concave side which will fit against the exterior of the main tube and extend roughly about halfway around the outside diameter of the main tube, this concave or saddle-like flange being placed against the main tube at a point where a hole has been formed laterally in the wall of the main tube. It must be held accurately in position on the main tube, while the brazing or soldering operation is performed, thus requiring a special jig or fixture for holding it in place.

As distinguished from these prior constructions, the present construction provides a second tube or branch tube which, in the immediate vicinity of the main tube, has an internal diameter approximately equal to the external diameter of the main tube, and has a diametrical opening through this portion of the second tube, through which the main tube may extend. The main tube is provided with a lateral opening in the desired location, then the second tube is slipped over one end of the main tube and moved along the main tube until the second tube is opposite the opening previously formed in the main tube. When the two tubes are properly positioned relative to each other, a projecting butt end or anchoring end of the second tube, projecting slightly beyond the main tube at the side opposite to the opening formed in the main tube, is crimped or compressed slightly in a direction across the main tube, thereby distorting or deforming the branch tube enough to clamp it tightly on the main tube, so that it will be held thereon in proper position during subsequent handling for brazing or soldering, without the need for any special jig or fixture to hold it in place.

BRIEF DESCRIPTION OF THE DRAWINGS

In the accompanying drawings, which are incorporated herein by reference and constitute a material part of the present disclosure, and which show an illustrative embodiment of the invention:

FIG. 1 is a side view of a typical joint according to the present invention, illustrating a main tube and a second or branch tube connected to each other;

FIG. 2 is a section taken approximately on the line 2—2 of FIG. 1, showing the initial position of the anchoring end of the branch tube in full lines, and the crimped position thereof in broken lines; and FIG. 3 is a view of the joint, looking toward the anchoring end of the branch tube in a direction axially of the branch tube, illustrating the anchoring end after crimping thereof.

DESCRIPTION OF THE PREFERRED EMBODIMENT

The main tube is illustrated at 5, and as above indicated it is preferably but not necessarily made of aluminum tubing having, for example, a diameter of about ⅜ of an inch. A lateral opening 6 is formed at the point where the branch is desired. This opening may be formed by any convenient means of conventional kind, well known in the art. For example, it may be punched by punching in a direction crosswise of the tube and roughly tangentially relative to the tube, while the tube is meanwhile encircled tightly in a fixture preventing deformation of the tube during the punching operation. This method of forming a lateral opening in a tube of soft metal such as aluminum, is well known per se.

The branch tube, which may also be called the second tube, is illustrated at 7, and is preferably of the same material as the first or main tube 5, and of the same diameter throughout the major part of its length. In the immediate vicinity of the main tube 5, however, the tube 7 is expanded as indicated at 8, so as to have an inside diameter substantially equal to the outside diameter of the tube 5, as indicated particularly in FIG. 2. The expansion of the tube 7 is preferably performed by forcing an expanding plunger axially into the open end 9 of the tube 7 while the tube 7 is held in a suitable fixture, the expanding plunger having an outside diameter substantially equal to the outside diameter of the main tube 5, and having a semi-spherical end, so that the shoulder between the expanded part, the non-expanded part of the tube 7, will have an internal shape which will fit snugly against the curved exterior wall of the main tube 5, when the tube 7 is subsequently apertured and is impaled on the tube 5.

After the expanding operation, a diametrical hole is punched or drilled through the expanded part 8 of the tube 7, while the tube is held firmly in a suitable enveloping fixture so that the punch will not distort or flatten the tube 7. The diametrical hole punched through the expanded part 8 of the tube 7 is of substantially the same internal diameter as the external diameter of the main tube 5, but just enough larger so that the main tube can be easily inserted through the hole. The hole is located in such position, relative to the shoulder between the expanded part and the non-expanded part of the tube 7, so that when the main tube 5 is shoved diametrically through the hole, the external curvature of the tube 5 will be snugly embraced by the curved part of the shoulder on the tube 7, as illustrated in FIG. 2.

When the expanding and punching of the branch tube 7 have been completed, the tube 7 is impaled on one end of the main tube 5 and moved axially along the main tube 5 until the tube 7 is brought to the proper position opposite the hole 6 previously punched in the tube 5. This position of the parts is illustrated in the drawings. When this proper position of the branch tube relative to the main tube has been reached, the slightly extended and expanded end of the branch tube 7 (the portion above the tube 5 when viewed as in FIGS. 1 and 2) is crimped or compressed in a crosswise direction, that is, a direction perpendicular to a plane containing the axes of both tubes. This crimping or lateral compression of the anchoring end of the branch tube distarts or deforms the end from its original circular cross section to the somewhat oval cross section shown in FIG. 3, and brings the sides thereof in from the full line position to the broken line position illustrated in FIG. 2. This distortion serves to clamp the branch tube on the main tube, by friction, sufficiently tightly to prevent accidental displacement during further normal handling for a brazing and soldering step. This obviates the need for any special jig or fixture to hold the two tubes in position relation to each other, from the time they are assembled to the time that the brazing or soldering operation is completed.

The brazing or soldering is then accomplished in any well known manner conventional in the art. The details of the brazing or soldering are subject to wide variation in accordance with the skill of the art, and are not important for purposes of the present invention, which relates to the manner in which the tubes are held in proper assembled relation to each other for brazing or soldering, rather than to the brazing or soldering step itself. Merely as an example of a typical operation, it may be stated that after the main tube and branch tube are assembled in the manner above described, and the branch tube is crimped to hold it tightly on the main tube, then the tubes may be cleaned in a conventional cleaning bath, after which the conventional "Handy Braze" material (obtainable on the open market from Handy and Harmon) may be applied to the outside of the joint between the two tubes in any convenient way as by a brush.

The tube assembly may then be placed in a drying oven which heats the parts to about 800 degrees Fahrenheit, the parts then going to a furnace which heats them further to about 1100 degrees Fahrenheit, the furnace containing a flux which, although originally a powder, becomes a liquid bath at the furnace temperature of about 1100 degrees Fahrenheit. The flux is conventional. The tube assembly, hung from a rack, is dipped into the flux in the furnace. The flux is sometimes called a salt bath, and is well known in the art. The tube parts remain in the bath for a short time, such as about 20 seconds, after which they are removed from the salt bath or flux bath and, while still remaining hot from the furnace, are dipped in a caustic cleaner bath at a temperature of about 200 degrees Fahrenheit for a few seconds, which caustic cleaner bath removes the residue of the salt bath. Then the parts are dipped in hot water to clean them off, then a cold water rinse to insure cleanliness and to bring the parts down to a temperature where they can be easily handled. As above indicated, these details of the brazing operation are mentioned merely as a typical example, since the brazing or soldering may be accomplished either in this way or in any other conventitonal way known in the art.

The above described construction is easy and inexpensive to manufacture, easy to assemble, and very economical in practice because it eliminates the need for special fixtures or jigs which are conventionally required to hold the tube parts in assembled relation to each other while going through the brazing or soldering steps. With the present construction, and without the need for special fixtures, the tubes when assembled to each other can be simply hung on any conventional rack to be carried through the heating equipment and the baths to perform the brazing or soldering and cleaning steps, without danger of having the branch tube become displaced to an incorrect position on the main tube. The racks may be supported by hand, or by a conventional conveyor.

The main tube is not necessarily a straight tube. Normally, the portion thereof where the branch tube connects with it, is straight, but beyond this straight portion the main tube may be curved or shaped in any desired way, an elbow or bend portion being shown, for example, by the broken lines 12 in FIG. 1.

It is to be understood that the disclosure is given by way of illustrative example only, rather than by way of limitation, and that without departing from the invention, the details may be varied.

What is claimed is:

1. A T-joint for fluid flow tubes comprising a main tube extending uninterruptedly past a joint location and being free of any internal restriction or obstruction at such joint location, said main tube having a lateral opening in only one side wall at said joint location, the opposite side wall being imperforate, and a branch tube extending in crosswise relation to said main tube at said joint location, said branch tube having a flow portion with a diameter substantially equal to that of said main tube and an expanded portion with an internal diameter substantially equal to the external diameter of said main tube, said expanded portion of said branch tube having two diametrically alined openings in opposite side walls, said main tube extending through said openings in said expanded portion of said branch tube with said opening in said main tube located within said branch tube and facing toward the flow portion of said branch tube, said expanded portion of said branch tube having a relatively short terminal end portion open at its end remote from said main tube and projecting laterally beyond said main tube diametrically opposite said flow portion of said branch tube, said projecting terminal end portion being crimped in a direction diametrically of said terminal portion to deform the material of said branch tube in the immediate vicinity of said main tube so that said branch tube is tightly engaged frictionally with said main tube sufficiently tightly to hold said branch tube initially in its intended location impaled on said main tube against accidental displacement, and metallic sealing material uniting said main tube to the surrounding portions of said branch tube to make a fluid tight joint between the two tubes.

2. A joint as defined in claim 1, wherein said metallic sealing material is brazing or soldering material.

References Cited

UNITED STATES PATENTS

| | | | |
|---|---|---|---|
| 548,998 | 10/1895 | Mannesmann | 285—150 |
| 1,322,250 | 11/1919 | Lewis. | |
| 2,179,089 | 11/1939 | Hauf. | |
| 2,614,827 | 10/1952 | Peach et al. | 285—382.5 X |
| 2,679,681 | 6/1954 | Resler | 285—382.4 X |
| 2,846,249 | 8/1958 | Johnson. | |
| 3,071,399 | 1/1963 | Cronin. | |
| 3,344,370 | 9/1967 | Sewell. | |
| 3,388,211 | 6/1968 | Nichols et al. | |

FOREIGN PATENTS 1,145,876  10/1957  France.

DAVID J. WILLIAMOWSKY, Primary Examiner

WAYNE L. SHEDD, Assistant Examiner

U.S. Cl. X.R.

29—470.5; 285—286, 287, 382.5; 287—54